United States Patent [19]

Holzer

[11] Patent Number: 5,056,493
[45] Date of Patent: Oct. 15, 1991

[54] ENVIRONMENTALLY HARMONIOUS FUEL TANK

[76] Inventor: Walter Holzer, Drosteweg 19, D-7758 Meersburg, Fed. Rep. of Germany

[21] Appl. No.: 466,578

[22] Filed: Jan. 17, 1990

[30] Foreign Application Priority Data

Jan. 24, 1989 [DE] Fed. Rep. of Germany ....... 3901978
Apr. 4, 1989 [DE] Fed. Rep. of Germany ....... 3910841
Jun. 2, 1989 [DE] Fed. Rep. of Germany ....... 3918073
Sep. 28, 1989 [DE] Fed. Rep. of Germany ....... 3932062

[51] Int. Cl.$^5$ .......................................... F02M 33/02
[52] U.S. Cl. .................. 123/518; 123/520; 123/516; 220/85 VR
[58] Field of Search ............... 123/516, 514, 518, 519, 123/520, 521; 220/85 R, 85 A, 85 B, 85 VR, 85 VS

[56] References Cited

U.S. PATENT DOCUMENTS

| 3,172,348 | 3/1965 | Berg | 123/518 |
| 3,617,034 | 11/1971 | Skinner | 123/518 |
| 3,683,878 | 8/1972 | Rogers | 123/518 |
| 3,949,720 | 4/1976 | Zipprich | 123/518 |
| 3,977,379 | 8/1976 | Weissenbach | 123/518 |
| 4,562,820 | 1/1986 | Jiminez | 123/516 |
| 4,829,968 | 5/1989 | Onofer | 123/518 |
| 4,926,825 | 5/1990 | Ohtaka | 123/520 |

FOREIGN PATENT DOCUMENTS 2601044 7/1976 Fed. Rep. of Germany ...... 123/516

Primary Examiner—Carl Stuart Miller
Attorney, Agent, or Firm—Paul H. Gallagher

[57] ABSTRACT

A fuel tank, for a vehicle or heating plant, includes a flexible air container therein, forming a fuel space outside the air container. The air container seals the interior of the fuel tank to the exterior and the fuel vapors in the fuel tank are drawn off and directed into the engine and burned. The vapors can be so drawn off by the vacuum produced by the engine, or by a pump. Fresh air from the exterior is drawn into and through the air container and directed into the fuel mixture for combustion, clearing out any vapors that may have collected in the air container. A filter is controllably utilized for adsorbing, or absorbing the vapors, and fresh air is controllably drawn into the filter for clearing those vapors out and directing them into the fuel mixture for combustion.

8 Claims, 3 Drawing Sheets

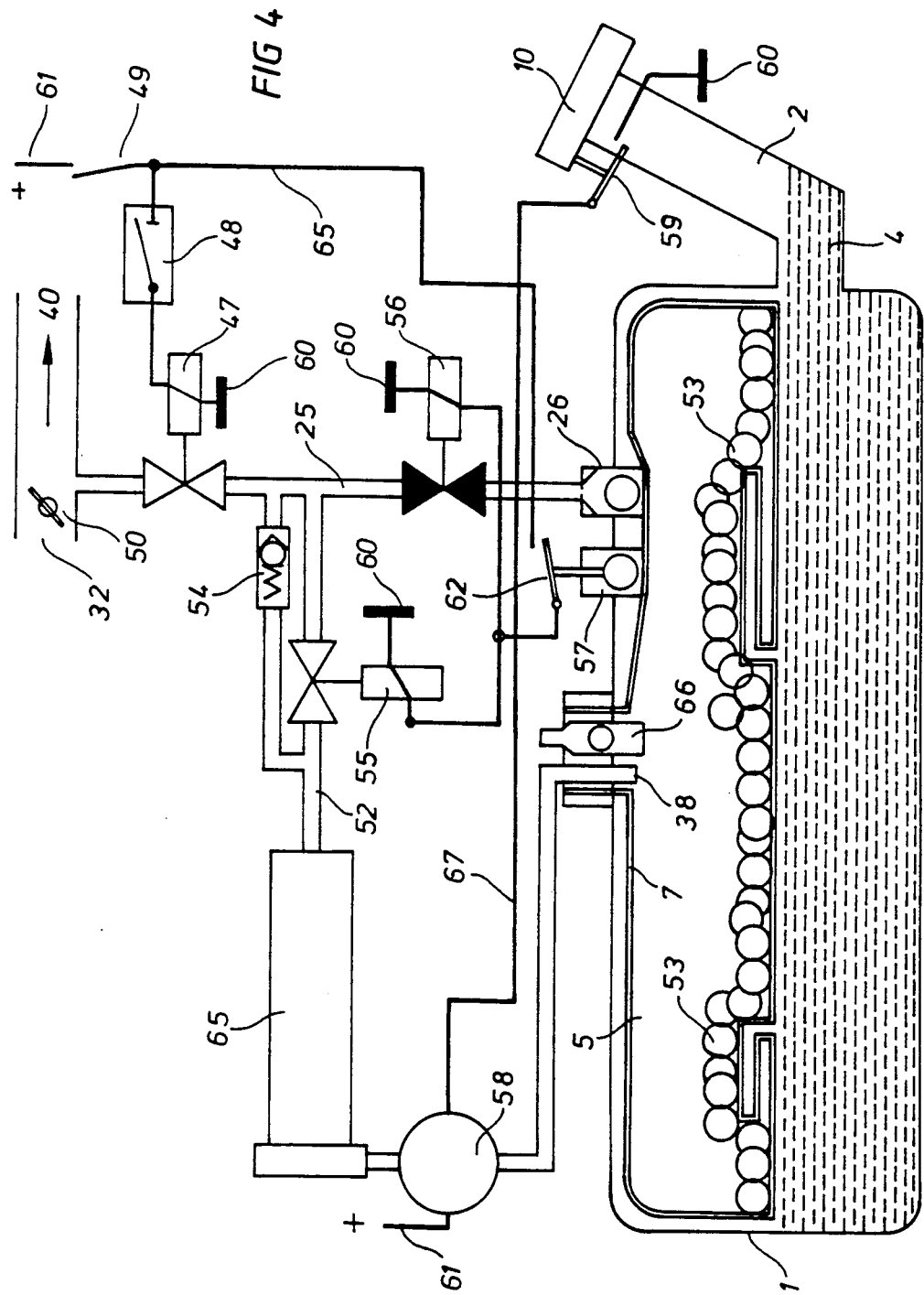

ENVIRONMENTALLY HARMONIOUS FUEL TANK

SUMMARY OF THE INVENTION

Generally, fuel tanks such as in motor vehicles, are closed containers, usually connected to the atmosphere merely by means of a small ventilation hole or port. These ventilation holes are generally provided with pressure valves to prevent emission of the fuel vapors from the tank into the environment.

In the case of such tanks, suctioning off of the vapor out of the interior of the tank is not effective, since that suction produces a reduced pressure, resulting in air streaming through the ventilation holes into the tank.

Heretofore a person was restricted to suctioning the gas vapors from the tank, which would be emitted therefrom in response to warming of the tank, and conducting them through a conduit to the fuel combustion engine, burning them there (DE-PS 21 06 609 Nissan).

The device of the present invention includes a flexible air container in the gas tank, above the gas level, and it includes at least one suction connection in the upper part of the fuel tank, and thereby, it is now possible to suction off the vapors from the tank, and in response to that action, the air container enlarges in size, corresponding to the gases taken off. Preferably the suctioning connection is provided in the filling nozzle.

In the case of a stationary combustion engine, the device includes a filter in the conduit conducting the vapors to the engine, this arrangement in this conduit preventing the fuel vapors from escaping to the atmosphere.

The device of the invention further includes the novel feature of combining the suction connection with a liquid valve to shut off the suction connection when all of the vapors have been withdrawn from the tank, and the liquid fuel reaches the suction connection. This provides an extremely simple arrangement of handling the fuel vapors, in that the suction is produced by the vacuum or reduced pressure in the engine. Consequently the fuel vapors are conducted directly into the combustion circuit of the engine and are burned in the engine, and their energy utilized.

The same features in the device referred to above, are effective for directing vapors that are suctioned from a fuel container to the burner of a heating plant.

The arrangement thus not only prevents the escape of the harmful vapors to the atmosphere, but utilizes the energy of the vapors.

The device of the invention possesses another advantage, in the drawing off of the vapors as referred to above, which includes a venturi in one of the fuel conduits, and in which the suction connection is joined with the venturi.

The device includes also a feature to prevent escape of vapors from the connection conduit between the suction connection and the suction mechanism, when the suction mechanism is turned off, which includes a valve closing the connection between the suction connection and the suction mechanism, when deficient pressure exists. Such a valve is preferably and most advantageously positioned in the vicinity of the mouth of the conduit in the combustion circuit. This arrangement of valves also controls the accumulation of fuel vapors in the filter, in that when the valve is closed, the vapors are prevented from entering the filter.

Another feature is a divided suction mechansim which serves the same purpose as just referred to, and is joined in an air proof connection with the filter.

A suction mechanism of the kind just referred to, which consists of a suction pump or pressure pump, that is joined with the filter, can be operated by means of a switching arrangement that is dependent on the filling step, so that it is operated only during filling. Such a switch can be for example a contact which is connected with the tank lid or cover.

The invention additionally includes the feature of a seal in the filling tube, into which the filling pistol is inserted, in the filling step.

Heretofore such a feature did not exist, because the displaced vapors would have to leak out through the filling tube. In that case air would be carried along with the filling stream, but by means of the seal in the filling tube, in the present case, no air can be carried along into the tank, and therefore there is no mixing of the air with the existing vapors, and accordingly there is no danger of explosion.

Additionally, in the case of utilizing the seal in the filling step, the air container in the tank would be placed under pressure, and the air is forced out of the flexible air container.

The vapors released as the fuel is inserted into the tank, which are outside the air container, are decreased by the filter.

In order not to disturb the quiet running of the combustion machine, it is desired to arrange additional directing or control devices in the connection conduit to dose or control the amount of the fuel vapors according to the motor's working condition. These can be known temperature-dependent or mixture-dependent sensors.

BRIEF DESCRIPTION OF THE SEVERAL VIEWS OF THE DRAWINGS

FIG. 4 is also a view similar to FIG. 1, but of another modified form.

DETAILED DESCRIPTION

Figures 1, 2:
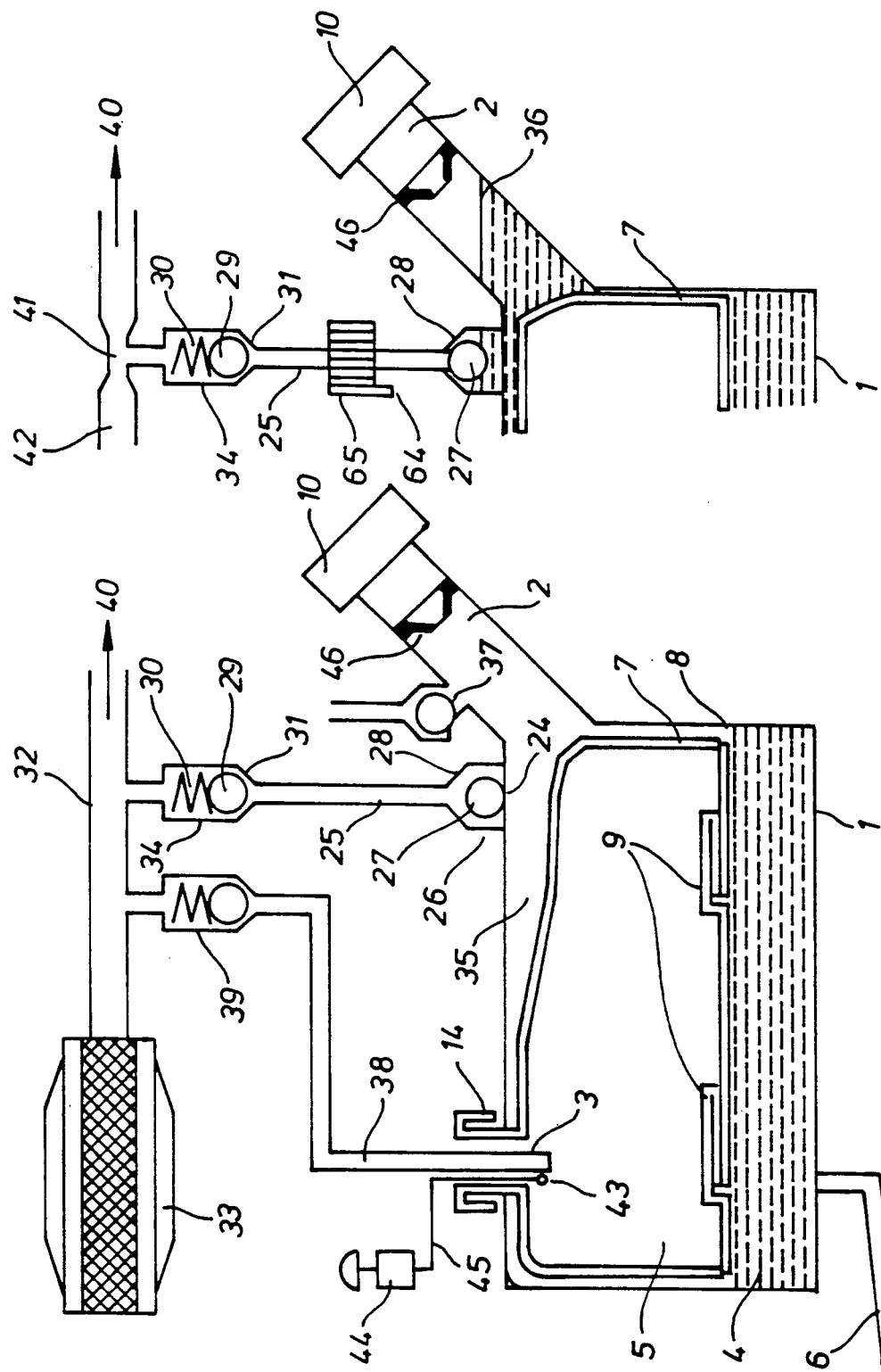
FIG. 1 is a semi-diagrammatic view of the apparatus of the invention.
FIG. 2 is a semi-diagrammatic view of the apparatus corresponding with the right hand portion of FIG. 1, but including modifications relative to the latter figure.

FIG. 1 shows a fuel container 1 having a filling tube 2 which is normally tightly closed with a lid 10. Within the container is a thin walled, flexible air container 5, which is sealed against the interior of the tank by a flange 14, and is in constant communication with the atmosphere through a ventilation opening 3. The fuel 4 in the tank is conveyed through a fuel pipe 6 to the motor, as in a vehicle.

In filling the tank, or emptying it by fuel withdrawal, the contour 7 of the flexible container 5 contracts, or expands, respectively, under the influence of atmospheric pressure. The contour 7 of the container develops folds 9, shown diagrammatically, in the contraction, and in the expansion these folds recede, or constitute a lesser portion of the contour.

The fuel container 1 has a suction connection 24 leading directly to a liquid shut off valve 26, which in its simplest form may consist of a light float ball 27 which in response to the suctioning off of the vapors in the container, is lifted up by the liquid and pressed against the valve seat 28, closing the conduit 25 leading from the valve. The conduit 25 leads to a vacuum controlled valve 31, which is normally closed by a spring 30 pressing against a ball 29 and forcing the ball downwardly to closing position, similarly to the valve 26.

The valve 31 is directly connected with the vacuum line 32 of the motor, which for the combustion therein, draws in the air through a filter 33, the air flowing in the direction of the arrow 40 to the motor.

Upon the motor being started, and running, the valve 31 is opened by the vacuum developed thereby, and the vapors are drawn off out of the space 35 in the fuel container 1, this space consitituting a vapor space or bubble. The vapors are drawn through the conduit 25, until the fuel in the tank 1 reaches the level 36, which is shown in FIG. 2. In this condition, the ball 27 is lifted and it is held against the valve seat 28 closing the valve, and it thereby prevents further drawing off of vapors or liquid fuel from the fuel tank 1.

If as a result of relatively high temperature, such as in the summer time, the fuel again vaporizes, the vapor bubble 35 again results, and the level of fuel lowers, and the valve 26 is again opened, and the drawing off step is restored.

When the motor is stationary, for example, and the vehicle is parked in the hot sunshine, the fuel vapors correspondingly develop, and these accumulate in a filter 65, of known kind and which may be an absorption or adsorption kind, and later, when the motor is again started, the vapors are cleared out of the filter by fresh air, which enters the filter by way of a connection 64, and it is directed to the motor, as indicated by the arrow 40, for combustion of the vapors.

The apparatus represented in FIG. 1 also includes an alterative arrangement wherein a suction or vacuum connection 37 is provided in the filling tube 2. In this arrangement the vapors ar drawn off from the filling tube 2, by vacuum, principally through the conduit 68.

FIG. 2 shows the inclusion of the adsorption filter 65 referred to above. This filter may for example be an active charcoal filter, and is positioned in the conduit 25. So long as the float ball 27 is in lower position, leaving the valve seat 28 open, fuel vapors pass through and reach the filter. If the float ball 27 rises, and closes, fresh air is drawn in by means of the reduced pressure or vacuum in the suction pipe 32, or the venturi 41, by means of the inlet connection 64 of the filter, and the filter is thereby regenerated or cleared.

The arrangement of FIG. 2 includes a vacuum valve 34 connected with the venturi 41, the latter for example being positioned in a fuel injection conduit 42 through which fuel flows in the direction of the arrow 40. This is an alternative design for an injection internal combustion engine.

Referring again to FIG. 1, the fuel tank 1 with the flexible air container 5 therein, permits also drawing off of the fuel vapors out the interior of the air container 5, by means of a suction pipe 38 which extends into the container and leads to and is connected with a vacuum valve 39 which is connected with a vacuum producing means, such as the conduit 32.

Fuel vapors in the container 5 can only proceed into the air bubble 35 in very small amounts, by means of diffusion of the fuel. The inclusion of the suction pipe 38 is provided principally as an additional precautionary measure.

A sensor 43 is incorporated in FIG. 1, this being connected by means of a connecting conduit 45 to an alarm signal 44, this feature also constituting principally a precautionary measure. This alarm signal 43 45, serves the purpose of detecting and indicating fuel vapors which may break out because of damage to the air container 7, or vapors that would result from long-term diffusion.

Figure 3:
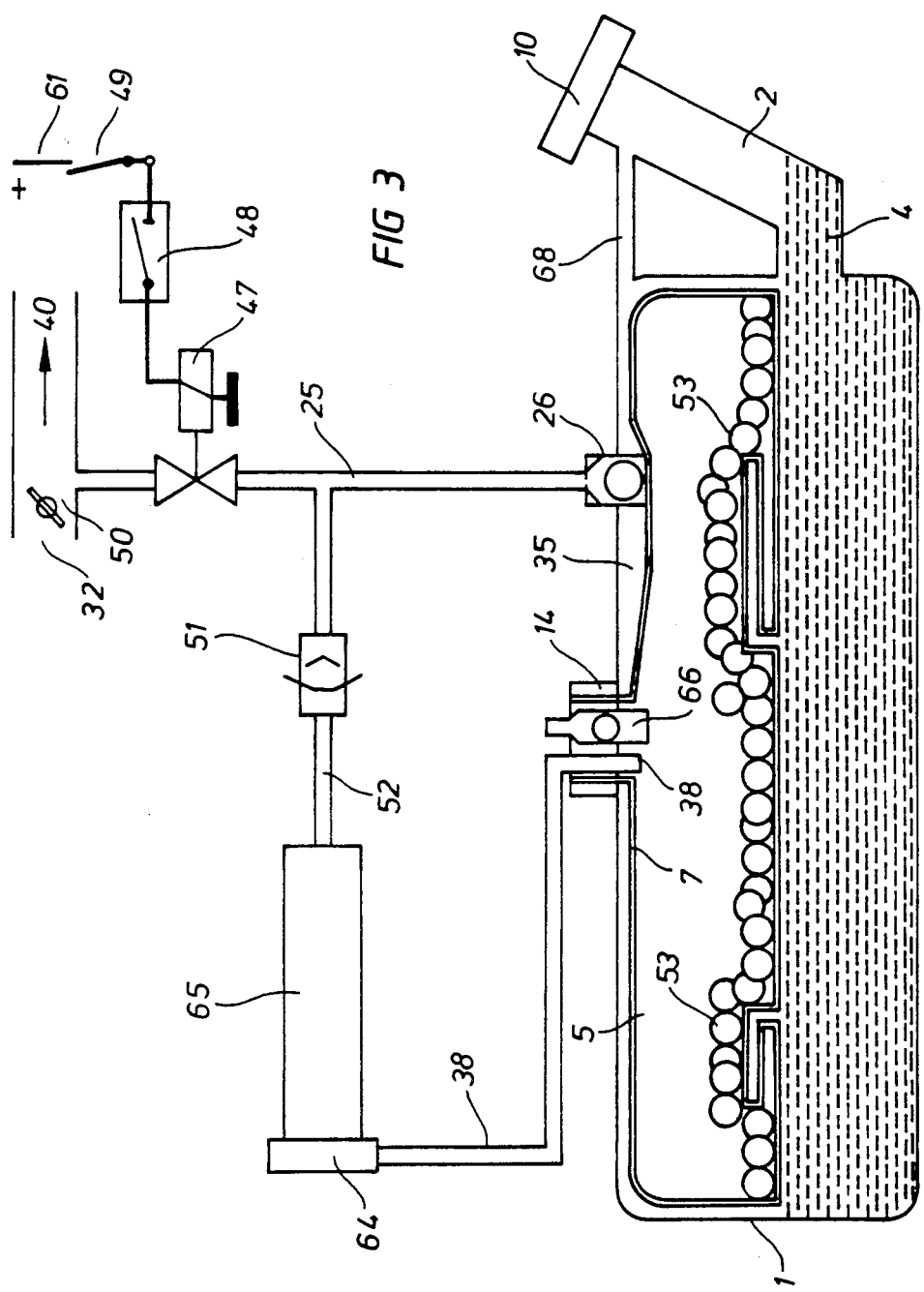
FIG. 3 is a view similar to FIG. 1, of a modified form.

FIG. 3 shows the simpliest construction of a fuel tank 1 according to the invention, having an air container 5, in combination with an active charcoal filter 65; regulation of the fuel vapor is into the suction pipe 32 of the vehicle motor, with a minimal expense in control mechanisms.

In this case, the liquid shut off valve 26 is provided in a simple form, being a float valve, and it closes the conduit 25 upon the fuel 4 reaching the valve. A magnet valve 47 enables freely drawing off of the fuel vapors to the motor only when the running condition of the motor allows it. In this example, a lambda sonde 48 provides a catalyst to determine whether the motor can properly be supplied with fuel vapors.

Upon the vacuum ceasing in the valve 47, and pressure developing therein, the motor can draw off fuel vapors from the fuel tank 1 through the shut off valve 26 and direct it to the combustion chamber therein. The double throttle 51 provides different throttle effects, in the opposite directions of passage therethrough. Leading from the filter 65, only a small amount of air can flow through this throttle, even if there is a high level of vacuum in the conduit 25. Accordingly it is assured that sufficient pressure is available to draw off the fuel vapors out of the fuel tank 1.

The small capacity of the throttle, provides that in driving, fresh air is drawn through the filter 65, and thereby the filter is cleared or regenerated.

On the other hand, during filling of the fuel tank, the throttle resistance of the double throttle 51 is small, so that dislocated fuel vapor masses can be easily displaced out of the fuel bubble 35, through the filter 65.

Of particular significance is the suction pipe 38, which leads from the air container 5 and directs fresh air to the filter 65 in clearing the filter. Accordingly the container 5 is cleared out by means of fresh air which flows through the valve 66.

The valve 66 also serves as a "rollover security valve", that is, it prevents spilling of the fuel in the event the vehicle should roll over.

The apparatus of FIG. 3 shows the use of elastic foam bodies 53, which may be used for minimum expansion volume, and thereby eliminate complicated and expensive ventilating features.

The foam bodies 53 are merely stored in the container 5, and they prevent the container totally collapsing in filling the fuel tank 1. These foam bodies are effective in the absence of unusual increased pressure.

FIG. 4 is a schematic view of a complete apparatus, incorporating several essential improvements, relative to FIG. 3.

In filling the fuel tank 1, a suction pump 58 is turned on, in response to the lid 10 being removed from the filling tube 2, in response to which the electrical contact 59 closes. The suction pump 58, thereupon operating, draws fuel vapors that emanate from the fuel tank and are outside of the air bubble 5, through the liquid shut off valve 26, and directs them through the shut off valve 56, and the bypass valve 54 to the active charcoal filter 65, where they are adsorbed. Also in this case, the cleaned air, after it has flowed through the filter 65, is directed through the conduit 38 into the air bubble 5 and it can then flow out through the valve 66.

The control of the direction of flow by means of the magnet valve 47 provides the advantage that this control is independent of the throttle effects, since the valves are fully either open or closed.

In this arrangement (FIG. 4) the shut off valve 56 is open in the absence of a flowing condition, while in contrast thereto, the magnet valve 47 is closed in that condition.

In filling the fuel tank, the ignition key contact 49 is normally open so that both valves are in a non-flowing condition, independent of the position of the level switch 57 which has a contact 62. The suction valve 47 is also closed in a non-flowing condition, and it closes the connection to the suction pipe 32 of the motor.

Throughout the filling step, i.e. as long as the tank lid 10 is off of the filler tube, the suction pump 58 consequently provides for a reduced pressure or vacuum in the fuel tank 1 so that the fuel vapors cannot escape out through the filler tube 2.

In this step of filling the fuel tank, the bypass valve 54 provides for a connection of the conduit 25 with the conduit 52, and thereby connects it with the filter 65.

The suction pump 58 is connected with an electrical source, or battery, as indicated at 61.

Upon the vapors being completely drawn off, as the float of the liquid shut off valve 26 is lifted from the fluid, it closes, and no further air or fuel vapors can flow through the filter 65.

In driving the vehicle, the ignition key contact 49 is closed and the shut off valve 56 and the magnet valve 55 can recover pressure upon the ball of the level switch 57 floating up, which thereby indicates that no vapors are present in the fuel tank 1 outside of the air container 5.

Upon closing the ignition key contact 49, the shut off valve 56 is closed, and the magnet valve 55 is open. Accordingly the requisite conditions are achieved, e.g. the lambda sonde 48 opens the suction valve 47 in order to clean out the adsorbed fuel vapors that are in the filter 65. Thereby air is drawn through the conduit 38 out of the air bubble 5 through the suction pump 58, which is stationary, and the filter, and directed through the conduit 52 and the opened magnet valve 55 into the conduit 25, and finally through the suction valve 47 to the suction pipe 32.

The passageways are pre dimensioned so as to provide the desired rate of flow of vapors, that is, neither too intensive nor too slow a rate.

In the present case, FIG. 4, similarly to that of FIG. 3, the cleaning out of the air container 5 with fresh air is to be considered as an additional precautionary measure.

The apparatus of FIG. 4 is to be considered a schematic presentation, for a better understanding of the functions of the apparatus. All of the switching elements, which in comparison to FIG. 3, are additionally shown and described, can be supplemented or eliminated according to desire or purpose.

The control of the suction valve 47 can, for example, be performed by means of a thermostat combination, responsive to the motor temperature, instead of by means of the lambda sonde 48, if desired.

The switching or control of the construction elements, by the connections 60 (three locations) can be varied. Instead of the specific arrangement shown, it is possible to utilize, in conjunction with the circuit diagram, pneumatic valves and mechanical construction parts.

Notwithstanding the simple specific construction of the air container 5 in the fuel tank 1, the features and functions of the invention are provided thereby, and they may be incorporated in more complex apparatus.

It is now possible to pump dangerous and environmentally harmful vapors out of the fuel tank 1 which heretofore was never done, and considered unthinkable, with the additional feature of directing them to a combustion process, thereby utilizing energy that was heretofore lost. It is also possible, with simple means, to achieve a high operating- and explosion-security, and overcome a possible danger.

An important feature is, additionally, that it is possible to provide such apparatus with only a small adsorption filter 65, since only the masses of the fuel vapors must be adsorbed, which become free in the "bubbling" or introduction of the fuel into the fuel tank. Now these vapors which previously were to be displaced, cannot even occur because of the presence of the air bubble 5 in the tank.

As used herein, the expression combustion engine is to be broadly interpreted to cover a heating plant.

I claim:

1. Apparatus for controlling fuel in connection with a combustion engine and a fuel tank, wherein liquid fuel in the tank vaporizes, comprising, means including a conduit for suctioning the vapors from the tank and conducting them to the combustion engine, and a flexible air container in the tank above the liquid fuel, the flexible air container being entirely self contained and being entirely continuous and closed except for a ventilation opening formed by a flange, the flange being secured to the tank and continuing said ventilation opening through an opening in the tank to the exterior, the container sealing the tank to the exterior through the tank opening and being sufficiently large to substantially fill the tank when the tank is empty of liquid fuel.

2. Apparatus according to claim 1, and including, a filter in said conduit.

3. Apparatus according to claim 1 including, means forming a stream path from the tank to the combustion engine parallel to said conduit for at least a portion of the conduit, and a filter in said stream path.

4. Apparatus according to claim 2 or 3, including, means in the tank above the level of liquid fuel in the tank and responsive to that level for controlling the flow of fuel selectively through said conduit or the stream path for correspondingly flowing it through the filter.

5. Apparatus according to claim 2 or 3, including, means in said conduit responsive to the running condition of the combustion engine for controlling the flow of fuel selectively through said conduit or the stream path for correspondingly flowing it through the filter.

6. Apparatus according to claim 2 including, means forming interconnection between the intake of the filter and the air container in the tank.

7. Apparatus according to claim 2 including, a suction/pressure pump, and means forming an air-tight conduit interconnecting the filter and the pump.

8. Apparatus according to claim 1 including, elastic/-resilient hollow bodies in the air container.

* * * * *